United States Patent [19]
Pagano

[11] 3,969,960
[45] July 20, 1976

[54] METHOD AND APPARATUS FOR TIGHTENING A BOLT TO EXERT A PREDETERMINED TENSION FORCE BY MONITORING BOLT ELONGATION WHILE THE BOLT IS BEING INSTALLED

[76] Inventor: Dominick A. Pagano, 10 Sasqua Trail, Georgetown, Conn. 06829

[22] Filed: May 13, 1974

[21] Appl. No.: 469,298

[52] U.S. Cl. .............................. 81/52.4 R; 73/88 F; 73/139
[51] Int. Cl.[2] .............................. B25B 23/142
[58] Field of Search .............................. 81/52.4 R, 52.5; 73/139, 88 F, 67.9, 67 T

[56] References Cited

UNITED STATES PATENTS

| | | | |
|---|---|---|---|
| 3,018,866 | 1/1962 | Elliott et al. | 81/52.4 R |
| 3,306,100 | 2/1967 | Wilhelm et al. | 75/88 F |
| 3,307,393 | 3/1967 | Kessler | 73/88 F |
| 3,759,090 | 9/1975 | McFaul et al. | 73/67.9 X |
| 3,774,479 | 11/1973 | Lesner | 81/52.5 |

FOREIGN PATENTS OR APPLICATIONS

| | | | |
|---|---|---|---|
| 211,756 | 11/1960 | Austria | 73/139 |

*Primary Examiner*—James L. Jones, Jr.
*Attorney, Agent, or Firm*—Parmelee, Johnson & Bollinger

[57] ABSTRACT

Method and apparatus for tightening a bolt or a machine screw to exert a predetermined tension force by monitoring bolt elongation while the bolt is being installed. The apparatus of the present invention includes a drive means adapted to engage the head of the bolt and torque applying means for rotating this drive means to thereby rotate and tighten the bolt. An ultrasonic transducer is associated with the drive means to contact the top of the bolt's head when engaged by the drive means. A power supply is provided to energize the ultrasonic transducer to generate ultrasonic energy which is transmitted lengthwise through the bolt to its shank end and is reflected from the shank end lengthwise back through the bolt to its head to be received by the ultrasonic transducer. A monitor coupled to the ultrasonic transducer measures the time required for the ultrasonic energy to complete this round-trip cycle and thereby monitors the elongation of the bolt indicated by change in this cycle time. This apparatus may also be equipped with means for automatically stopping the torque-applying means when the predetermined tension force exerted by the bolt is achieved.

19 Claims, 5 Drawing Figures

COMPRESSED AIR SOURCE
SERVO-VALVE ACTUATOR
STRETCH CONSTANT
MAX. STRETCH DESIRED

METHOD AND APPARATUS FOR TIGHTENING A BOLT TO EXERT A PREDETERMINED TENSION FORCE BY MONITORING BOLT ELONGATION WHILE THE BOLT IS BEING INSTALLED

BACKGROUND OF THE INVENTION

Field of the Invention

The present invention relates to a method and apparatus for tightening a bolt or a machine screw to exert a predetermined tension force. Many machines and other devices used in large industrial or smaller consumer applications are assembled with bolts which should be tightened to exert a predetermined tension force. For example, cylinder heads of internal combustion engines are usually anchored to the engine block by a pattern of bolts, each of which should be tightened to exert a predetermined, uniform, tension force. Steel building structures are also frequently assembled with bolts which should be tightened to exert a predetermined tension force. Pressurized fluid containing vessels and chemical reactors are often assembled by an arrangement of bolts intended to exert predetermined holding forces.

In such cases bolt assembly applications it is important that the predetermined tension force to be exerted be accurately achieved. If, for example, the cylinder head is not uniformly and tightly bolted to the engine block in an internal combustion engine, the engine head or underlying gasket may be damaged or leaks can occur. Similarly, steel building sructures which are assembled with improperly or inaccurately tightened bolts will not achieve their specified strength and may be subject to fatigue and consequent weakness. In general, if the bolts are not tightened up to the predetermined specified tension force, they are too loose and may cause failure by vibrating looser or by allowing leakage of pressurized fluids or chemicals or by allowing metal parts to creep out of position. If the bolts are tightened too much, they become over-stressed and can fail by sudden rupture, for example, by the head breaking off from the shank or by the shank breaking at the threaded region. This type of over-stressed breakage can lead to sudden failure of the equipment involved, such as when the over-tight stud bolts shear off to release the wheels from a moving vehicle.

The present invention is intended to be used to properly and accurately tighten bolts, machine screws, threaded studs and the like in these and other applications.

Description of the Prior Art

A variety of devices have previously been used to determine certain characteristics of a tightened bolt. For example, U.S. Pat. No. 3,306,100 - Wilhelm et al. discloses an ultrasonic bolt tension tester in which the resonant frequency of the bolt and changes in resonant frequency of the bolt as it elongates are measured. A very complex system is utilized involving the mixing of signals from a reference oscillator. U.S. Pat. Nos. 3,354,705 - Dyer and 3,440,869 - Hardiman discloses the use of strain gauges to measure the torque force being exerted on the head of a tightened bolt.

Power-driven torque wrenches which stop automatically when a desired applied torque is exerted on the head of a bolt are disclosed in U.S. Pat. Nos. 2,756,622-La Belle and 3,429,179 - Bowen et al. U.S. Pat. No. 2,600,549 - Ledbetter discloses a torque wrench driven by an electric motor.

Other devices for measuring torque applied to the bolt head are disclosed in U.S. Pats. Nos. 2,957,342 - Hanneman; 3,285,057 - De Zurik; 3,643,501 - Pauley; 2,968,943 - Statham; 3,209,177 - Minasian; 3,303,694 - D'Onofrio; 3,486,369 - Korzilius; 3,565,193 - Wirth; and 3,368,396 - Van Burkleo et al.

Devices of the type generally discribed in the patents noted above are not entirely satisfactory. Those previous devices which seek to measure the tension force exerted by a bolt by measuring the bolt's resonant frequency as an indication of its elongation are extremely complex. Others which attempt to measure the torque applied to the head of a bolt as an indication of tension force exerted actually do not measure torque of the bolt per se, but are influenced by a number of factors. That is, this technique of measuring the torque applied to the head of a bolt really is rendered inaccurate and misleading by other effects such as the friction occurring between the head of the bolt and the washer or plate underlying the bolt head, the friction existing between the shank of the bolt and the bore hole and friction between the threads of the bolt and the threads in the bore hole. Thus, prior art devices which measure torque applied to the head of a bolt are partly measuring friction effects and not torque. If the bolt threads are rusty or dirty, the friction is high and the bolt is really not screwed up very tightly when the rated torque is applied to the bolt head. If the bolt is new and well greased, it is relatively easy to over-torque the bolt and twist its head off. The friction effects are mostly removed and the application of rated torque to the head may speedily twist the head to a point which exceeds the torsional strength of the shank. Thus the apparent torque applied to the bolt head is not a true indication of the tension force ultimately exerted, which is the quantity of actual interest.

Several prior art devices are capable of measuring applied torque to the bolt head, bolt elongation, or the tension force exerted by the bolt only after the bolt is installed. This two-step installation and subsequent testing operation undesirably increases installation time. An operator of such subsequent testing apparatus must be familiar with its operation in addition to the operation of the torque wrench or other device for installing the bolt in the first place.

In summary, prior art methods and apparatus for attempting to tighten bolts to exert a predetermined tension force have exhibited certain drawbacks.

SUMMARY OF THE INVENTION

In the preferred embodiment, to be described below in detail, the method and apparatus of the present invention are capable of tightening a bolt to exert a predetermined tension force by measuring the elongation of the bolt occurring during its actual installation. As used herein, the word "bolt" is intended to include any threaded fastening device (including but not limited to machine screws, threaded studs, cap screws, threaded lugs, set screws) which cooperates, for exaple, with a threaded bore in a machine casing, a nut or other threaded base or threaded member. Such a bolt generally has a threaded end, a shank, and a head which may be gripped or engaged by drive means such as a wrench so that the bolt may be tightened or loosened. The shank may be threaded along its entire length or part of its length.

The "top" or "top surface" of the bolt head as used herein means the surface of the head opposite to the threaded end. This term applies regardless of the orientation in which the bolt is installed, i.e. regardless of which end of the bolt is up or down.

The apparatus of the present invention includes a drive means for applying torque to the head of the bolt shown as a socket which is adapted to receive and engage the bolt head. The socket is rotated or driven by a suitable motor, such as a compressed air-driven impact motor. A main drive shaft, designed to removably carry the socket, couples this socket to the compressed air-driven impact motor.

An ultasonic transducer is positioned within the socket to firmly contact the top surface of the head of the bolt when engaged by the socket. The ultra-sonic transducer is mounted on the end of a resiliently, reciprocally mounted rod and is supported by a stiff, yet flexible bellows which aligns the transducer for face-to-face contact with the top surface of the bolt head. This rod is removably disposed in an accepting bore in the main drive shaft. This removable rod feature makes the ultrasonic transducer together with its rod-like mount easily replaceable in the event of damage. The ultrasonic transducer is damped so that the time which is available to receive ultrasonic signals is increased relative to the time that it is transmitting ultrasonic signals.

This ultrasonic transducer is connected to a power supply by a coaxial conductor having two portions. A first rotatable conductor portion is axially disposed in and is rotatable with the main drive shaft and the rotor of the compressed air-driven impact motor. The second non-rotatable conductor portion, connected to the first portion by a conducting coaxial swivel connector, is in turn linked to the power supply.

The power supply is also equipped with a signal receiving and timing circuit for measuring the time required for ultrasonic energy to traverse the bolt's length and return back to the top of the bolt head.

This apparatus of the present invention operates as follows. The socket is engaged on the head of the bolt bringing the ultrasonic transducer into firm contact with the top of the bolt head. This transducer is regularly, repeatedly energized by abrupt signals from the power supply causing the transducer to generate ultrasonic energy pulses i.e. to transduce regular repeated electrical pulses into ultrasonic energy pulses, which are transmitted from the top of the head through the bolt to the threaded end and are reflected and travel back to the bolt head to be received by the transducer. The transducer upon reception generates an elecrical output signal, i.e. transduces ultrasonic energy back into an electrical signal which is received by the power supply receiving and timing circuit. The time required for the ultrasonic energy to traverse the length of the bolt and return is measured by the timing circuit. Any increase in this required time indicates an increase in the length of the bolt. The compressed air-driven impact motor is then operated until a desired bolt elongation is obtained.

Thus, by using bolts having known stretch constants, this apparatus may be employed to tighten each such bolt to exert a predetermined tension force.

The apparatus may also be equipped with an automatic shut-off device. For example, the compressed air source may be provided with an servovalve which operates to turn off the compressed air supply when the bolt has been elongated to the desired degree to exert the desired tension force. This feature of the apparatus permits automatic precise tightening of each bolt in sequence and prevents inadvertent undertightening or overtightening.

The method of the present invention includes the steps of engaging the bolt head with the drive means, contacting the top of the bolt head with the ultrasonic transducer; energizing the transducer to transmit ultrasonic energy through the bolt to the bolt's threaded end where it is reflected back to the bolt head and received by the transducer; receiving the output signal of the transducer and thus measuring the time required for the ultrasonic energy to traverse and be reflected back through the bolt; tightening the bolt by rotating it with the drive means and relating the change in time required for the ultrasonic energy to complete its circuit to the change in length of elongation of the bolt. This method may also include the step of automatically stopping rotation of the drive means and hence stopping the tightening of the bolt when the desired bolt elongation has been achieved.

Accordingly, it is an object of the present invention to provide a unique and novel method and apparatus for tightening a bolt to exert a predetermined tension force by monitoring bolt elongation while the bolt is being installed. This method and apparatus measure the quantity of real interest in bolt constructions or assemblies, i.e. the tension force exerted by the installed bolt. Additionally, this measurement is made while the bolt is being installed, rather than after bolt installation.

Other objects, aspects, and advantages of the present invention will be pointed out in, or will be understood from the following detailed description, when considered in conjunction with the accompanying drawings.

BRIEF DESCRIPTION OF THE DRAWINGS

Corresponding reference numbers indicate corresponding structural elements and corresponding characteristic features in each of the respective drawings.

DESCRIPTION OF THE PREFERRED EMBODIMENT

Figures 1, 2:
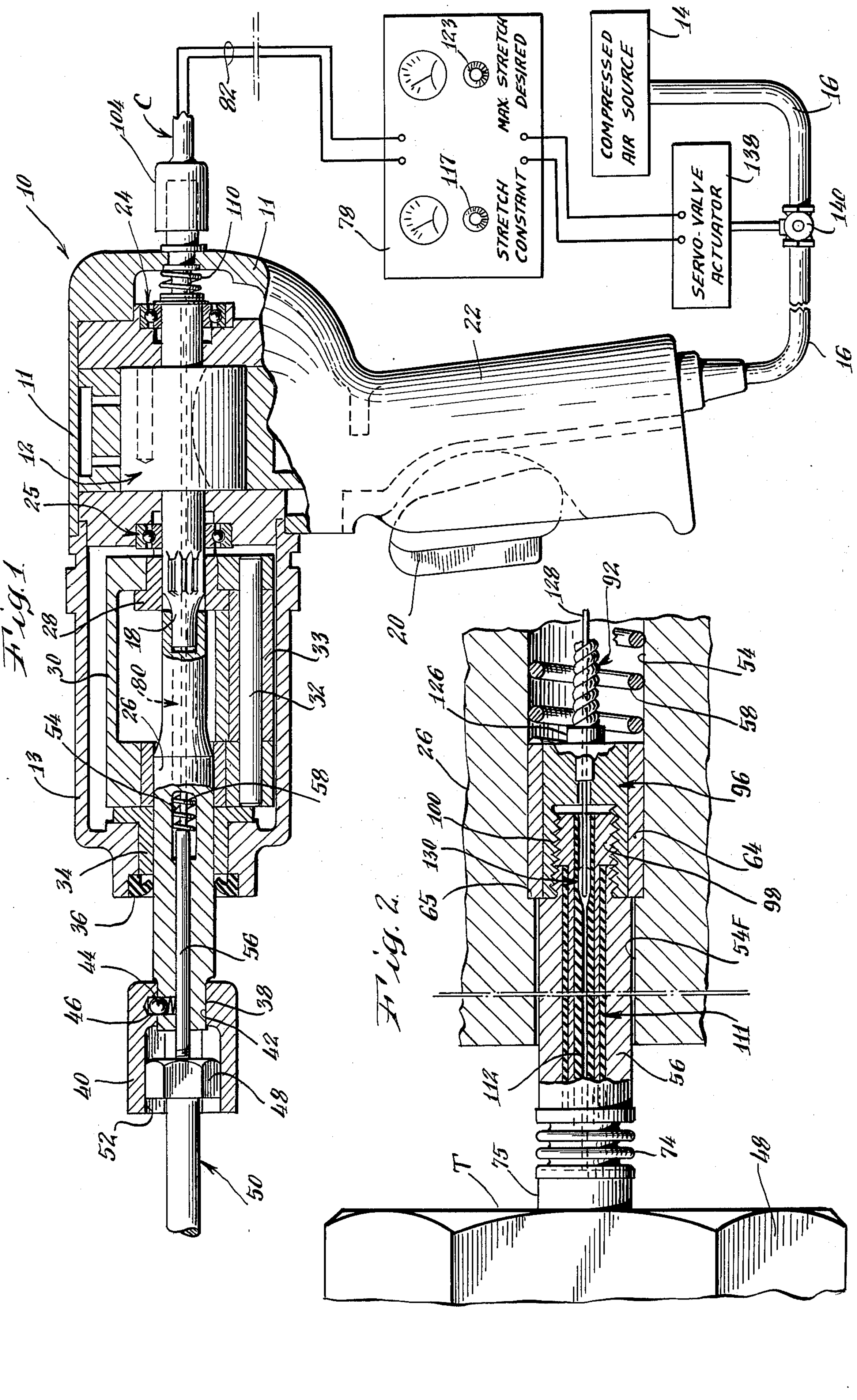
FIG. 1 is a side elevational view, shown partly in section, of a pneumatic energized power wrench or torque wrench embodying the present invention for tightening a bolt to exert a predetermined tension force while the bolt is being installed. The power supply receiving and timing circuit and servovalve and its actuator are schematically shown in diagram. A source of comressed air for energizing the power wrench is also illustrated.
FIG. 2 is an enlarged sectional view of the top of the bolt head and the neighboring portion of this apparatus showing the ultrasonice transducer, mounted on the end of its mounting rod, carried in the axial mainshaft bore of the power wrench.

FIG. 1 illustrates a pneumatic energized power wrench or torque wrench apparatus embodying the present invention, used to tighten a bolt to exert a predetermined tension force by monitoring the bolt elongation during bolt installation. Illustrated is a hand-held pneumatic impact torque wrench 10 such as that shown and described in the publication by the Chicago Pneumatic Tool Company titled "Instruction and Parts Book for PNEUMATIC REVERSIBLE IMPACT WRENCH, CP-3441, Model 'A'", Third Edition, 1972.

This impact torque wrench 10 includes a housing having a rear portion 11 and a front portion 13, and has a compressed air-driven motor, which includes a rotor 12, that is linked to a compressed air source 14 by an air hose 16. The rotor has a splined shaft 18 which projects into the front housing portion 13. The flow of compressed air to the motor is manually controlled by a trigger 20 mounted in the pistol grip-type handle 22 extending down from the rear housing portion 11.

The rotor 12 of the compressed air-driven motor is supported by antifriction bearings 24 and 25 mounted in the rear housing portion 11. A main drive shaft 26, mounted in and projecting out of the front wrench housing portion 13, is coupled to the splined rotor shaft 18 by a series of components including a correspondingly splined dog cam 28 and a clutch cage 30. The rotor shaft 18 is positively coupled to the dog cam 28 by their respective interengaging splines, and the clutch cage 30 is positively coupled to the dog cam 28 by a clutch pin 32. A clutch dog 33 is mounted on the clutch pin 32 to engage the main drive shaft 26. The main drive shaft 26 is supported in the front housing portion 13 by a bushing 34 and is enclosed by an oil seal 36. These constructions are commercially available in the tool as shown and are explained in greater detail in the publication by the Chicago Pneumatic Tool Company noted above.

The main drive shaft 26 is provided with a square driving end 38 to engage and carry drive means 40 for the bolt head shown as a socket having a corresponding square hole 42. This square driving end 38 has a resiliently mounted retainer ball 44 on one of its faces which is accepted by a corresponding dimple 46 in one face of the socket's square hole 42 to hold the socket axially in place on the main drive shaft 26.

The socket 40 is adapted to fit over and grip the head 48 of a bolt 50, as shown in FIG. 1. This socket 40 may have a four, six, eight, or twelve point drive hole 52 depending upon the type of bolt head, either square or hexagonal, which the wrench 10 is to install. Additionally, various sockets having different sizes may be interchangeably attached to the main drive shaft 26 depending upon the size of the bolt to be installed.

In accordance with the preferred embodiment of the present invention, the main drive shaft 26, the splined rotor shaft 18, and the rotor 12 are provided with an axial bore 54. An ultrasonic transducer mounting rod 56 is reciprocally carried in this bore 54. This rod 56 is urged forward with respect to the main drive shaft 26 by a spring 58 (see also FIGS. 2 and 3) which is also mounted in the axial bore 54. The spring 58 is compressed between a fixed shoulder stop and a movable shoulder sleeve. The fixed shoulder is shown in detail in FIG. 3 as a threaded sleeve 60, screwed into a correspondingly threaded portion 62 of the axial bore 54, and the movable shoulder is shown in detail in FIG. 2 as an axially slidable sleeve 64. The forward end of the rod 56 projects into the interior of the socket drive hole 52 as shown in FIG. 1. The spring 58 and the slidable sleeve 64 are carried in an enlarged portion of the axial bore 54, while the rod 56 is carried in a smaller diameter portion 54F (FIG. 2) of the bore 54 forming an annular rabet 65 which limits the forward movement of the slidable sleeve 64 and the attached rod 56.

Figure 5:
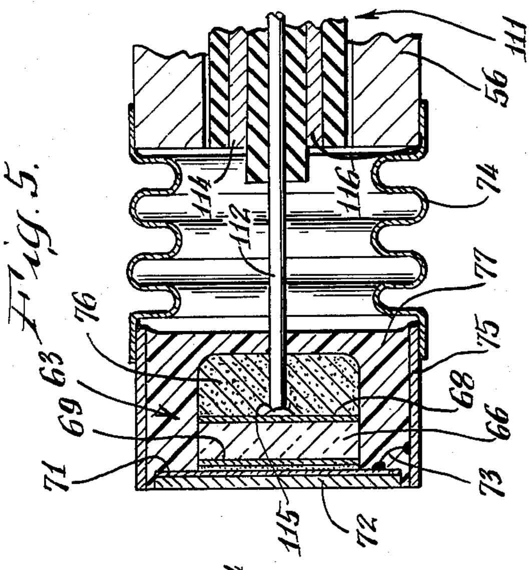
FIG. 5 is a greatly enlarged cross-sectional view of the resiliently mounted transducer.

As shown in the enlarged view of FIG. 5, the forward end of the rod 56 which projects out of the main drive shaft 26 is equipped with an ultrasonic transducer 63 including a piezo-electric element 66. This element 66, which is capable both of transducing an electrical signal into ultrasnic energy and of trandsucing ultrasonic energy into an electrical signal is preferably a ceramic element, such as lead metaniobate or lead zirconate-titanate. This element 66 is coated with two electrically conductive layers 68 and 69 of highly conductive material such as silver or gold, forming electrodes on its front and back surfaces. Positioned between the front one of these electrodes 69 and the top surface T of the bolt head 48 is wear resistant means shown as a wear resistant disc plate 72. This wear resistant plate 72 is made of a very hard material, for example, such as aluminum oxide, ruby sapphire, silicon carbide, etc.

In order to make electrical contact with the electrode 69, there is a layer 71 of electrically conductive material on the rear surface of this wear resistant plate which is cemented in conductive relationship against the electrode 69. A small electrical lead 73 is attached, for example, as by solder, to the conductive layer 71 and is similarly attached at its other end to the inside surface of a protective rigid housing 75. This housing 75 is shown as being cylindrical and is preferably made of strong corrosive-resistant metal such as stainless steel and is arranged to encircle the transducer 63 together with its sound absorbing vibration dissipating means 76, to be described.

A stiff yet flexible, conductive convoluted metallic bellows 74 is attached at one end to the housing 75. The other end of the bellows is attached to the rod 56. The sound absorbing vibration dissipating means 76 located behind the piezo-electric element 66 is illustratively shown as a sound absoring slug which acts to damp the mechanical oscillations of the element 66. This damping slug 76 is cemented to the electrode 68 on the back of the transducer 63 in order to decrease the time during which the transducer generates ultrasonic energy relative to the time during which the transducer can receive ultrasonic energy. Thus, this damping slug enables the method and apparatus of this invention to be employed even with relatively short bolts in which the elapsed time between transmission and receipt of the ultrasonic energy bursts is short. This damping slug 76 may be made, for example, from tungsten powder mixed with a binder such as an epoxy resin.

Preferably, this damping mass 76 provides critical damping so that the transducer 63 only generates two or three cycles of ultrasonic energy each time it is energized by an electrical signal pulse. That is, each transmitted ultrasonic pulse (or burst) only contains two or three cycles of ultrasonic energy.

An encapsulating medium 77, such as epoxy compound, fills the cylindrical housing 75 completely enclosing the transducer 73, together with its damping slug 76.

In this preferred embodiment, the transducer 63 as a whole unit is considered to include the damping slug 76 and the wear plate 72, together with the piezo-electric element 66 so that the tool can be used with long or short bolts. It is noted that in certain cases the transducer 63 may be constructed without including the damping slug 76, where the elapsed time after transmission of bursts of ultrasonic energy and before receipt of those bursts is sufficiently long to provide a clear distinction between the tail end of each transmitted burst and the beginning of each received burst, for example, in cases of use with longer bolts. Other sound absorbing dissipating material may be used in lieu of the slug 76. In certain cases, the wear resistant plate 72 can be replaced by other wear resistant means. However, the construction, as shown in FIG. 5, is preferred because it operates to advantage in a wide range of bolt tightening applications with a wide range of bolt lengths as typically encountered in industry.

As shown in FIG. 2, the spring 58 which urges the rod 56 forward in the main drive shaft 26 toward the interior of the socket drive hole 52 urges the wear resistant surface 72 of the ultrasonic transducer 66 into firm contact with the top surface "T" of the head 48 of the bolt 50 when this bolt is engaged by the socket.

The transducer 63 is connected by a coaxial conductor C to an energizing circuit 78, which also includes a receiving and timing circuit. This conductor is formed in two main sections, the first section being a rotatable section 80 which passes through the axial bore 54 in the main drive shaft 26, the splined rotor shaft 18 and the rotor 12. The second section 82 is non-rotatable, is external to the impact torque wrench 10 and connects this wrench to transducer energizing receiving and timing circuit 78.

The rotatable coaxial conductor section 80 is also divided into several sections. The first is a rigid section 89 shown in FIG. 4 mounted in the rotor 12 and splined shaft 18, comprising a central conducting bar 84, a first insulating sheath 86, a conducting sheath 88, and a second insulating sheath 90. The second rotatable conductor section is a flexible, extensible, coaxial conducting cable 92 (FIGS. 2 and 3) coupled to the rigid section 89 by a suitable coaxial plug arrangement such as that shown at 94 in FIG. 3. This coaxial cable 92 is anchored at one end in the fixed sleeve 60, extends through the spring 58 and is anchored at the other end in the slidable sleeve 64 (FIG. 2) where it is connected to a second suitable coaxial plug 96. The transducer mounting rod 56 is provided with a coaxial conductor 111 which terminates at one end in a plug receptacle 98 which corresponds to and is connected to the cable plug 96, and is linked at the other end to the transducer element 66. The plug 96 and plug receptacle 98 may be threaded as at 100 in a manually disengageable joint to insure positive axial coupling of the rod 56 to the slidable sleeve 64. This plug arrangement permits the entire rod-transducer assembly to be easily removed by unscrewing and replaced should damage or other transducer failure occur.

Figure 4:
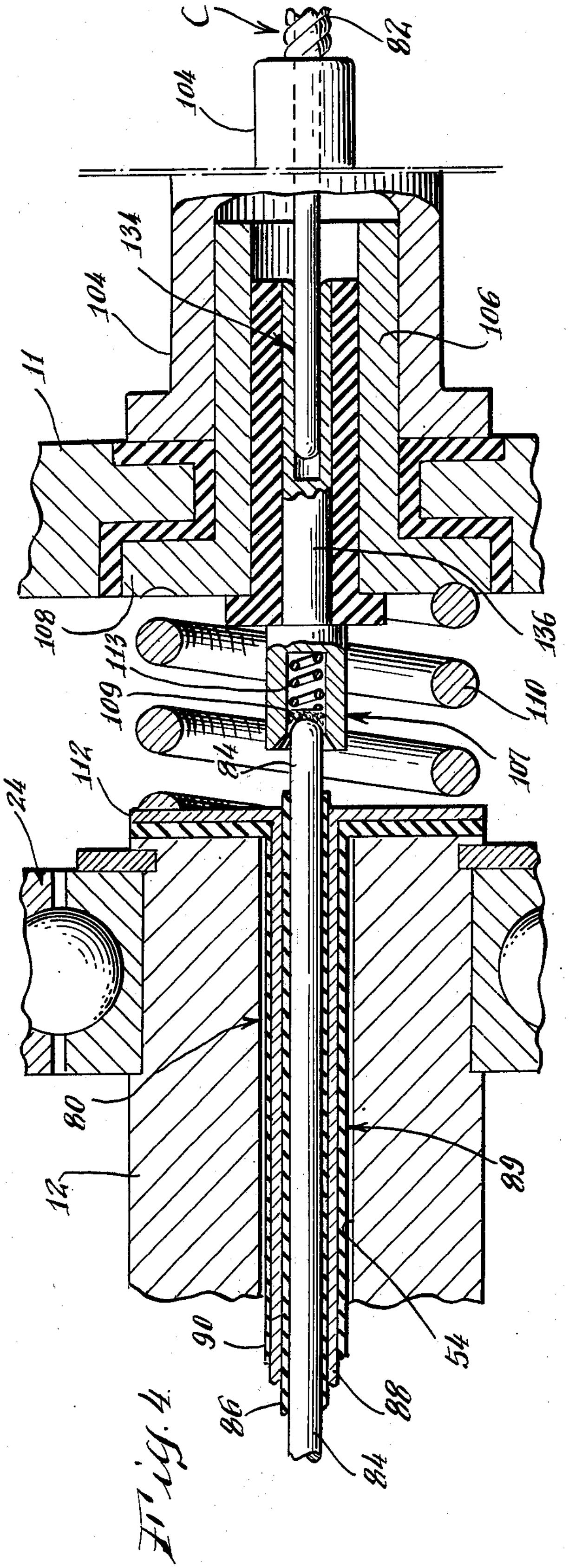
FIG. 4 is an enlarged partial sectional view of this apparatus showing the coaxial swivel connection between the rotatable and non-rotatable portions of the coaxial conductor. A quick connector bayonet plug is also illustrated which couples the transducer equipment in the impact wrench to the power supply.

The non-rotatable coaxial conductor section 82 is a coaxial cable (FIG. 1) connected at one end to the transducer energizing supply receiving and timing circuit 78 and terminating at the other end in a coaxial bayonet connector 104, shown in detail in FIG. 4. This bayonet connector 104 is plugged into a female coaxial connector 106 mounted in the rear housing section 11 and having an inner swivel joint socket 107 and an outer circular flange 108. The inner swivel 107 is adapted to contact the central rigid rotatable conducting bar 84 by resilient contact means comprising a conductive fuzz button 109 of springy conductive metal strands backed up by a compression coil spring 113. This resilient contact means 109, 113 assures good electrical contact in spite of the wear. The rotatable conducting bar 84 is carried in the rotor. The outer circular flange 108 contacts a spring 110 which, in turn, contacts a second flange 112 formed onto the coaxial conducting sheath 88. Thus, the coaxial connection between the rotatable and non-rotatable coaxial conductor sections is completed by this coaxial swivel connector including a swivel socket 107 and spring 110.

The central conductor 112 (FIGS. 2 and 5) of the coaxial conductor 111 is connected by soldering at 115 to the rear electrode 68. The concentric outer sheath 114 conductor of this coaxial conductor 111 is connected by a lead 116 through the metallic bellows 74 and the wear plate 72 to the front electrode 69. In this manner, the transducer element 66 can be energized by applying an electrical potential through this coaxial conductor 111 to the electrodes 68 and 69.

Figure 3:
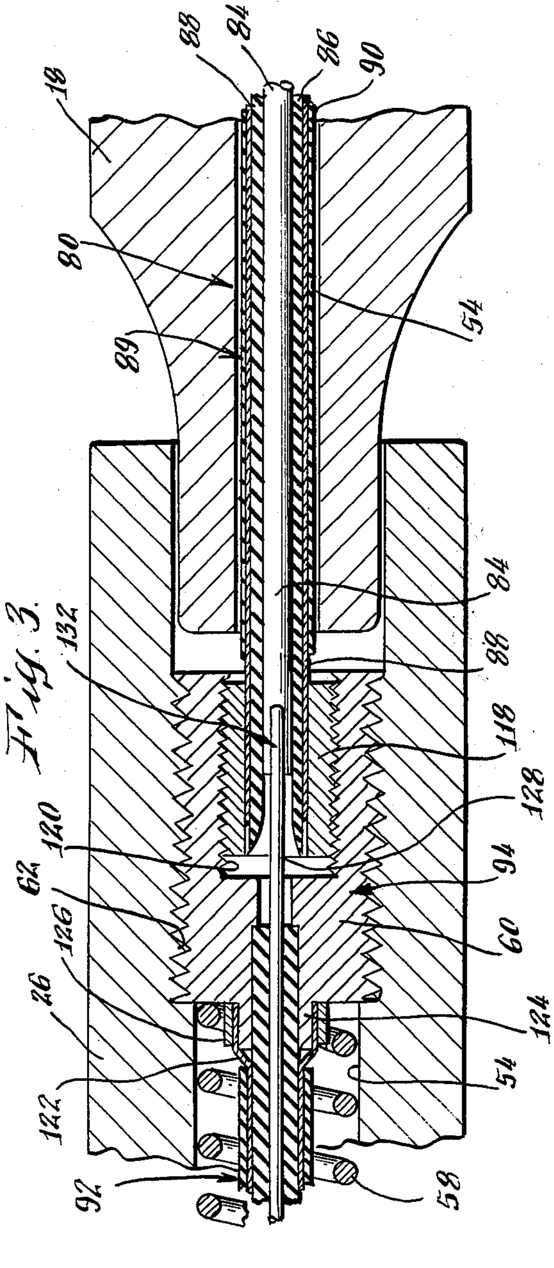
FIG. 3 is an enlarged partial sectional view of this apparatus showing the connection between a rigid section and a flexible, extensible section of the rotatable portion of the coaxial conductor disposed within the main drive shaft and within the compressed air-driven impact motor rotor.

The plug connection 94 in FIG. 3 includes a conductive metal screw insert 118, for example of brass, which is soldered to the tubular conductor 88. This insert 118 is screwed into the threaded bore 120 of the threaded sleeve 60. This threaded sleeve 60 thereby is electrically connected to the tubular conductor 88. In turn, this threaded sleeve 60 is electrically connected to the conductive braid 122 of the flexible coaxial cable section 92 by means of a cylindrical nose portion 124 protruding under the braid 122 and secured thereto by an encircling clamp ring 126.

Similarly, as shown in FIG. 2, the forward end of the braid of the flexible coaxial cable 92 is attached by a clamp ring 126 to a cylindrical nose portion (not shown) on the movable plug 96.

The inner conductors 112 (FIG. 2) and 128 are detachably interconnected by a bayonet connection 130. Similarly, the inner conductors 128 (FIG. 3) and 84 are detachably interconnected by another bayonet connection 132. A third bayonet connection 134 (FIG. 4) serves to interconnect the inner conductor of the external coaxial cable 82 and the shank 136 of the swivel member 107.

The apparatus of the present invention operates as follows: The socket 40 is engaged on the head 48 of a bolt 50 to be tightened with the ultrasonic transducer wear face 72 in firm ontact with the top of this bolt head 48. The stiff yet flexible bellows 74 assures that the front of the transducer unit 63 engages in flat face-to-face contact with the top "T" of the bolt head. Furthermore, the spring 58 mounted within the main drive shaft 26, compressed between the fixed stop sleeve 60 and the slidable stop sleeve 64, into which the transducer mounting rod 56 is screwed, insures this firm contact by urgining the rod 56 forward within hollow shaft 26.

The transducing energizing supply receiving and timing circuit 78 is turned on and applies a regular, repeated electrical signal pulse between the electrodes 68 and 69, respectively. Each time that the element 66 is energized by the electrical signal, it generates a burst of ultrasonic energy. That is, the element 66 transduces the electrical signal into ultrasonic energy, which is transmitted through the bolt 50 to the bolt's threaded end. Here the ultrasonic energy burst is reflected back toward the bolt's head 48.

As explained above, the element may be provided with a damping mass 76 to limit the time during which a pulse of ultrasonic energy is generated relative to the time such energy may be received by the crystal. Thus, when the reflected burst reaches the bolt head 48, the element 66 is ready to receive it. When pulse reception occurs, the element 66 transduces the received ultrasonic burst back into an electrical signal appearing between the electrodes 68 and 69. This electrical signal is received at the receiving and timing circuit 78 where the length of time required for the ultrasonic energy burst to traverse the length of the bolt and to return is measured.

The bolt 50 is then tightened by operating the impact torque wrench 10 while the ultrasonic transducing unit 63 is being regularly repeatedly energized. The receiving and timing circuit measures the change in time required for the ultrasonic energy pulses to traverse the length of the bolt and return to the element 66. In this manner, the elongation of the bolt may be accurately measured. Knowing the stretch constant of the bolt, this bolt elongation may be related to the tension force being exerted by the bolt.

The transducer energizing supply receiving and timing circuit 78 may be equipped to measure elongation of bolts of various material by providing it with an adjustment 117 related to the respective bolt stretch constants.

Additionally, the apparatus of the present invention may include a mechanism for automatically stopping the impact torque wrench when a desired bolt elongation has been achieved. For example, the receiving and timing circuit may be connected to a servo-valve actuator 138 which closes a servo-valve 140 shutting off flow of compressed air to the wrench 10 when the desired stretch, as selected on the dial 123, has been reached.

The apparatus of the present invention permits precisely tightening a bolt to exert a desired predetermined tension force without overtightening. It achieves this objective in a one-step operation while the bolt is being installed. Further, it measures the bolt elongation which is directly related to the tension force exerted by the bolt rather than the torque applied to the head of the bolt. The tension force exerted is the quantity of true interest. The measure of applied torque has certain inaccuracies, as explained in the introduction.

In lieu of a piezo-electric transducer, a magnetostrictive transducer may also be used. The ceramic piezo-electric transducer is preferred because it can be arranged as a small compact unit, as shown.

Although a specific embodiment of the invention has been disclosed herein in detail, it is to be understood that this is for purposes of illustration. This disclosure is not to be construed as limiting the scope of the invention, since the described method and structure may be changed in various ways by those skilled in the art in order to adapt torque wrench apparatus and method to particular applications.

I claim:

1. Torque wrench apparatus for tightening a bolt to exert a predetermined tension force by monitoring bolt elongation while the bolt is being installed comprising:

drive means adapted to engage the head of the bolt;

a main shaft equipped to carry said drive means on one end and having an axial bore therethrough;

means, coupled to said main shaft, for rotating said main shaft and said drive means to thereby rotate and tighten said bolt;

a rod mounted in said main shaft axial bore and movable axially with respect to said bore and projectable out of said main shaft axial bore at the end of said main shaft which is associated with said drive means; said rod being adapted to rotate with said main shaft;

an ultrasonic transducer, capable of generating and receiving ultrasonic energy, mounted on the projectable end of said rod and also associated with said drive means;

means for urging said end of said rod out of said main shaft axial bore and thus urging said ultrasonic transducer into contact with top surface of the head of the bolt when engaged by said drive means, said ultrasonic transducer and said rod being rotatable with the bolt when in contact therewith during bolt installation;

means for energizing said ultrasonic transducer to generate ultrasonic energy, for transmitting through the bolt from its head to its threaded end for being reflected from this end back to the bolt's head, finally to be received by said ultrasonic transducer; and monitoring means coupled to said ultrasonic transducer for sensing the time required for the ultrasonic energy to be transmitted through the bolt to the bolt's threaded end and reflected back to the bolt's head to measure bolt elongation.

2. The torque wrench apparatus for tightening a bolt to exert a predetermined tension force by monitoring bolt elongation while the bolt is being installed as claimed in claim 1 wherein said ultrasonic transducer is damped to decrease the time during which ultrasonic energy may be generated relative to the time ultrasonic energy may be received by said transducer.

3. The torque wrench apparatus for tightening a bolt to exert a predetermined tension force by monitoring bolt elongation while the bolt is being installed as claimed in claim 1, wherein said ultrasonic transducer is a piezo-electric element.

4. The torque wrench apparatus for tightening a bolt to exert a predetermined tension force by monitoring bolt elongation while the bolt is being installed as claimed in claim 3, wherein said piezo-electric element is provided with wear resistant means for contacting the head of the bolt.

5. The torque wrench apparatus for tightening a bolt to exert a predetermined tension force by monitoring bolt elongation while the bolt is being installed as claimed in claim 1, wherein said ultrasonic transducer includes a piezo-electric element having a front conductive metal plated face and a rear conductive metal plated face, both plated faces being electrically connected to said means for energizing said transducer and said front plated face being directed toward the top surface of the bolt head when engaged by said drive means.

6. The torque wrench apparatus for tightening a bolt to exert a predetermined tension force by monitoring bolt elongation while the bolt is being installed as claimed in claim 5, wherein said element is further provided with wear resistant means, overlying said front plated face, for contacting the top surface of the head of the bolt.

7. The torque wrench apparatus for tightening a bolt to exert a predetermined tension force by monitoring bolt elongation while the bolt is being installed as claimed in claim 6, wherein said element is provided with a damping mass to decrease the time during which ultrasonic energy is generated relative to the time ultrasonic energy may be received by said element.

8. The torque wrench apparatus for tightening a bolt to exert a predetermined tension force by monitoring bolt elongation while the bolt is being installed as claimed in claim 7, further comprising:

automatic stop means for stopping said rotating means from rotating said drive means and the bolt when the elongation of the bolt reaches a predetermined value.

9. The torque wrench apparatus for tightening a bolt to exert a predetermined tension force by monitoring bolt elongation while the bolt is being installed as claimed in claim 1, further comprising:

a flexible bellows mounted on the projectable end of said rod in encircling relation to said ultrasonic transducer, said bellows serving for accommodating misalignment of said transducer with respect to the top surface of the head of a bolt when in contact with said bolt head.

10. The torque wrench apparatus for tightening a bolt to exert a predetermined tension force by monitoring bolt elongation while the bolt is being installed as claimed in claim 1, further comprising:

a coaxial conductor, having first and second conductor sections, connecting said ultrasonic tranducer to said power supply means, said first conductor section being mounted in said main shaft and in said rod to rotate therewith and said second conductor section being non-rotatably coupled to said energizing means, and electrically conductive coaxial swivel means for connecting said first coaxial conductor section to said second coaxial conductor section.

11. The torque wrench apparatus as claimed in claim 10, in which:

said first coaxial conductor section includes a portion which is flexible for permitting said rod to move axially with respect to said bore.

12. Apparatus for tightening a bolt to a predetermined elongation comprising:

an ultrasonic transducer positioned at an end of a rod, said transducer being engageable with a first end of a bolt, flexible mounting means mounting said transducer on said end of said rod for allowing said transducer to align with said first end of the bolt when in contact therewith, drive means rotatable about an axis for applying a tightening force to said first end of the bolt, said drive means having a bore and said rod being mounted for in-and-out movement along said bore, means urging said end of said rod out of said bore for pressing said transducer into contact with said first end of the bolt, electrical circuit means extending along said rod and being connected to said transducer for energizing said transducer for transmitting ultrasonic energy from said first end through the length of the bolt to its other end to be reflected to return through the length of the bolt to said first end, means connected to said circuit means for measuring the change in time required for the ultrasonic energy to be transmitted and returned through the length of the bolt for monitoring the elongation of the bolt, and means for indicating that a predetermined elongation of the bolt has been reached.

13. Torque wrench apparatus for tightening a bolt to exert a predetermined tension force by monitoring bolt elongation while the bolt is being installed comprising:

drive means adapted to engage the head of the bolt;

rotating means for rotating the drive means to thereby rotate the head of the bolt for tightening the bolt;

said rotating means having a passage therein;

electrical circuit means extending along said passage;

an ultrasonic transducer capable of generating and receiving ultrasonic energy positioned within said drive means;

said electrical circuit means being connected to said transducer;

said transducer being rotatable for rotating with the head of the bolt and said electrical circuit means including swivel means for permitting such rotation of said transducer;

means for urging said ultrasonic transducer into contact with the top surface of the head of the bolt while the bolt head is engaged by and is being rotated by said drive means;

energizing means connected through said circuit means to said transducer for energizing said ultrasonic transducer to generate ultrasonic energy for transmitting through the bolt from its head to its threaded end for being reflected from this end back through the bolt to its head finally to be received by said ultrasonic transducer; and means coupled to said ultrasonic transducer for sensing the change in time required for the ultrasonic energy to be transmitted through to the bolt's threaded end and back to the bolt's head for thereby measuring bolt elongation while the bolt is being tightened by said drive means in rotating the head of the bolt.

14. The torque wrench apparatus for tightening a bolt to exert a predetermined tension force by monitoring bolt elongation while the bolt is being installed as claimed in claim 13 further comprising:

automatic stop means for stopping said rotating means from rotating said drive means when the elongation of the bolt reaches a predetermined value, corresponding to a predetermined tension value.

15. Torque wrench apparatus for tightening a bolt to exert a predetermined tension force by monitoring bolt elongation while the bolt is being installed comprising:

drive means adapted to engage the head of the bolt;

rotating means for rotating the drive means to thereby rotate the head of the bolt for tightening the bolt;

a rotatable drive shaft coupled at a first end to said rotating means and adapted at its second end to carry said drive means, said shaft being formed to have an axial bore extending therethrough from its first end to its second end;

an ultrasonic transducer, capable of generating and receiving ultrasonic energy, associated with the drive means;

means for urging said ultrasonic transducer into contact with the top surface of the head of the bolt while the bolt head is engaged by and is being rotated by said drive means;

said means for urging said ultrasonic transducer into contact with the top surface of the head of the bolt while the bolt head is engaged and is being rotated by said drive means including a rod mounted within said axial bore and being movable along said axial bore for projecting out of said second end of said rotatable drive shaft and having said ultrasonic transducer mounted on its outwardly projecting end;

means for energizing said ultrasonic transducer to generate ultrasonic energy for transmitting through the bolt from its head to its threaded end for being reflected from this end back through the bolt to its head finally to be received by said ultrasonic transducer; and time monitoring means coupled to said ultrasonic transducer responsive to the length of time required for the ultrasonic energy to be transmitted through to the bolt's threaded end and back to the bolt's head for thereby measuring bolt elongation while the bolt is being tightened by said drive means in rotating the head of the bolt.

16. The torque wrench apparatus for tightening a bolt to exert a predetermined tension force by monitoring bolt elongation while the bolt is being installed as claimed in claim 15, in which:

said means for urging said ultrasonic transducer into contact with the top surface of the head of a bolt also includes a shoulder stop provided in said axial bore; and spring means in said axial bore compressed between said shoulder stop and said movable rod for pushing said rod toward said second end of said rotatable drive shaft.

17. The torque wrench apparatus for tightening a bolt to exert a predetermined tension force by monitoring bolt elongation while the bolt is being installed as claimed in claim 15, in which:

said rod together with the ultrasonic transducer thereon are removable as a unit from said axial bore for convenient replacement thereof.

18. The torque wrench apparatus for tightening a bolt to exert a predetermined tension force by monitoring bolt elongation while the bolt is being installed as claimed in claim 15, in which:

an axially movable member is provided in said axial bore, means are provided for removably coupling said rod to said movable member, stop means is provided in said bore, and spring means is positioned between said stop means and said movable member for urging said rod toward its extended position, whereby said ultrasonic transducer and said rod are replaceable.

19. The torque wrench apparatus for tightening a bolt to exert a predetermined tension force by monitoring bolt elongation while the bolt is being installed as claimed in claim 18, wherein said means for removably coupling said rod to said movable member includes:

said movable member and said rod one of which has a threaded socket and the other of which has a mating threaded portion adapted to be screwed into and out of said threaded socket.

* * * * *